US008220734B2

(12) United States Patent
Vanderheyden et al.

(10) Patent No.: US 8,220,734 B2
(45) Date of Patent: Jul. 17, 2012

(54) TAPE DRIVE

(75) Inventors: William J. Vanderheyden, Loveland, CO (US); Peter R. Coburn, LaFayette, CO (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 13/029,600

(22) Filed: Feb. 17, 2011

(65) Prior Publication Data
US 2011/0139917 A1 Jun. 16, 2011

Related U.S. Application Data

(62) Division of application No. 11/272,267, filed on Nov. 10, 2005, now Pat. No. 7,913,943.

(51) Int. Cl.
*G11B 15/66* (2006.01)
(52) U.S. Cl. .................. 242/332.4; 242/532.1; 242/582
(58) Field of Classification Search .............. 242/332.4, 242/332.7, 332.8, 532.1, 532.6, 582, 579, 242/587, 587.1, 587.2, 587.3
See application file for complete search history.

(56) References Cited

U.S. PATENT DOCUMENTS

| 3,606,192 | A | | 9/1971 | Goddard |
| 3,809,218 | A | * | 5/1974 | Furst ......................... 242/580.1 |
| 4,572,460 | A | | 2/1986 | Hertrich |
| 4,877,198 | A | * | 10/1989 | Gershenson et al. ...... 242/587.1 |
| 5,431,356 | A | | 7/1995 | Horstman et al. |
| 6,079,651 | A | | 6/2000 | Hamming |
| 6,216,970 | B1 | | 4/2001 | Byrne et al. |
| 6,227,475 | B1 | | 5/2001 | McAllister et al. |
| 6,364,233 | B1 | | 4/2002 | Crowley |
| 6,565,028 | B2 | | 5/2003 | Sasaki et al. |
| 6,588,694 | B1 | | 7/2003 | Wilkerson |
| 6,758,433 | B2 | | 7/2004 | Imai |
| 6,824,090 | B2 | | 11/2004 | Imai |
| 6,915,975 | B2 | | 7/2005 | Vanderheyden |
| 7,614,439 | B2 | * | 11/2009 | Lukos ......................... 242/587.2 |
| 7,913,943 | B1 | * | 3/2011 | Vanderheyden et al. .. 242/332.4 |
| 2004/0129817 | A1 | | 7/2004 | Hamming |
| 2004/0155135 | A1 | * | 8/2004 | Hoge .......................... 242/348.2 |

FOREIGN PATENT DOCUMENTS
EP 0 444 632 A1 9/1991
* cited by examiner

*Primary Examiner* — William A Rivera
(74) *Attorney, Agent, or Firm* — Brooks Kushman P.C.

(57) ABSTRACT

A tape drive, which is configured to receive a tape cartridge having a cartridge leader attached to magnetic tape, includes a take-up reel and a drive leader that is attachable to the cartridge leader. The drive leader has an attachment location attached to the take-up reel and a tapered portion proximate the attachment location.

16 Claims, 4 Drawing Sheets

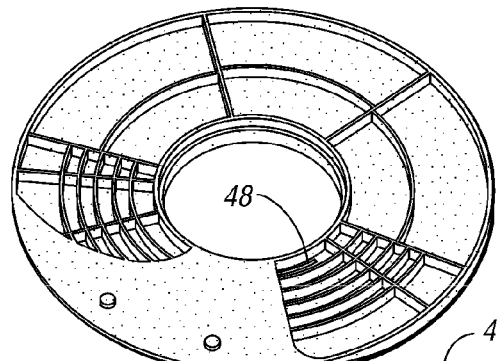
*Fig. 2*
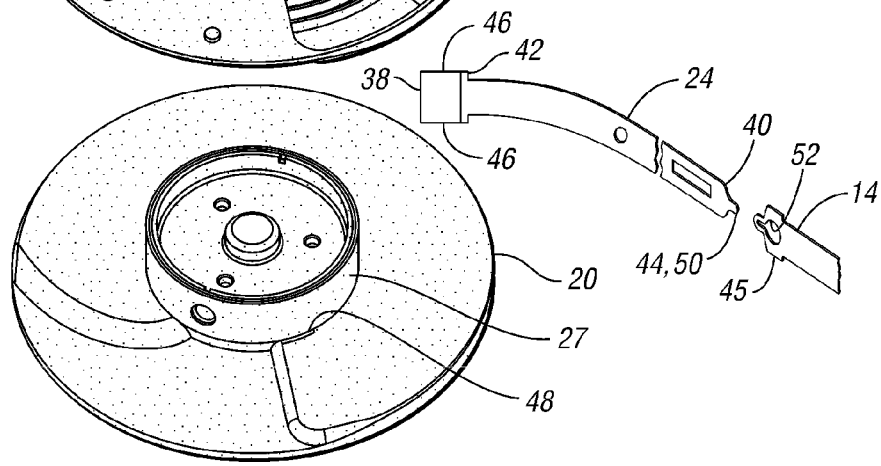
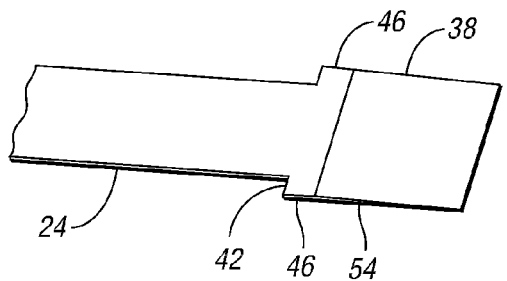
*Fig. 3*
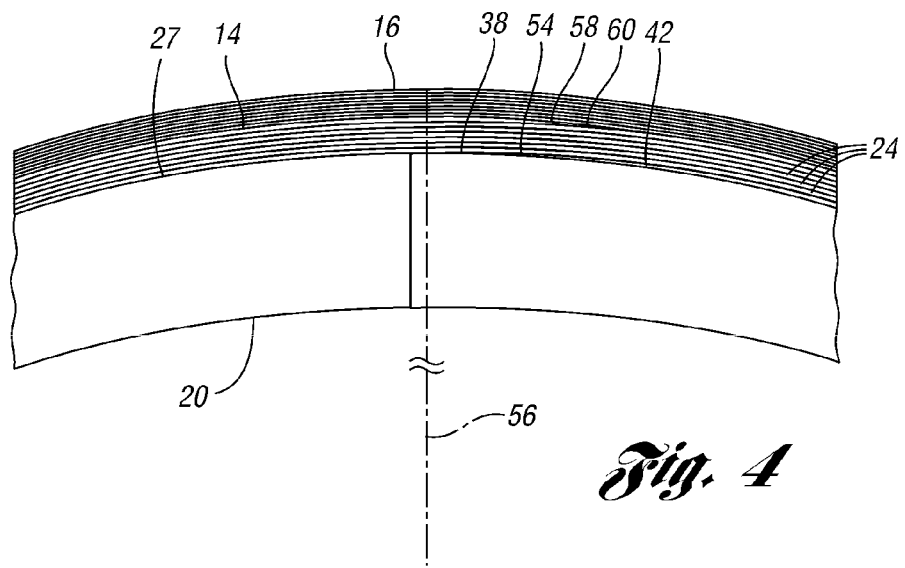
*Fig. 4*

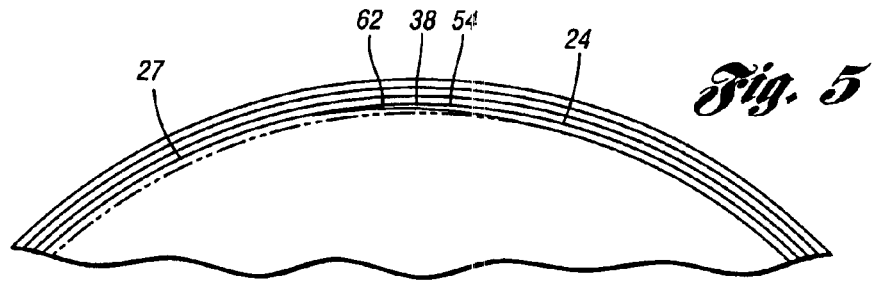
Fig. 5
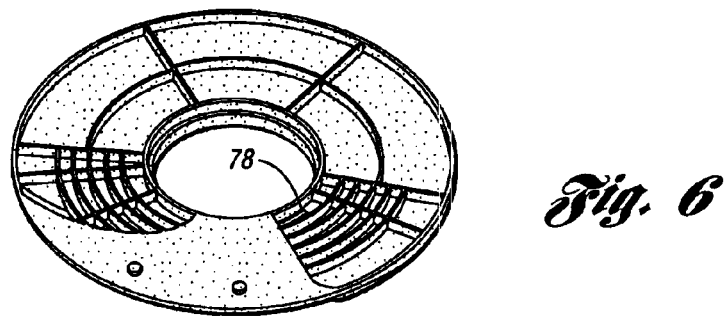
Fig. 6
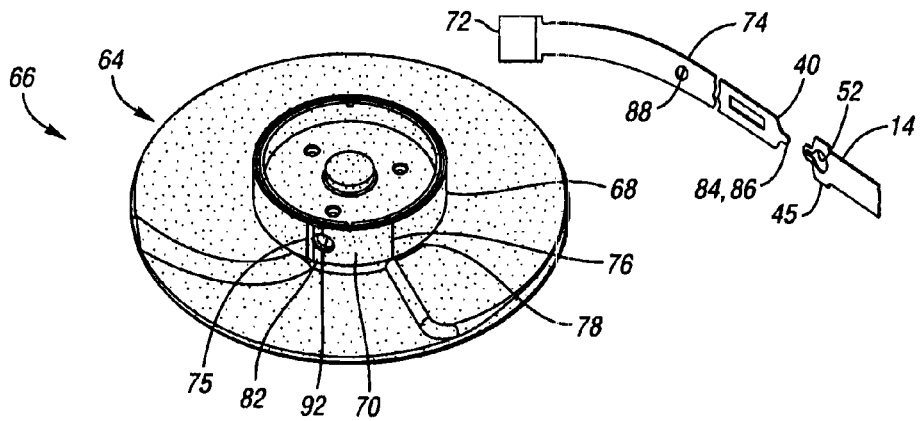
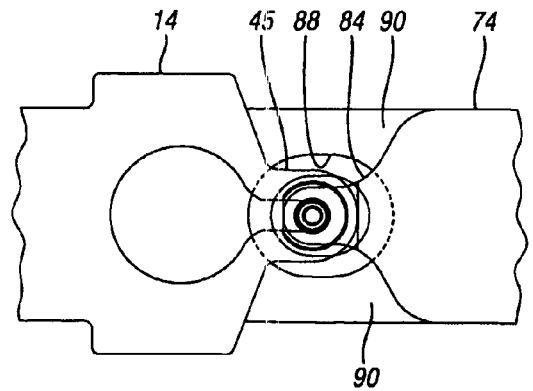
Fig. 9

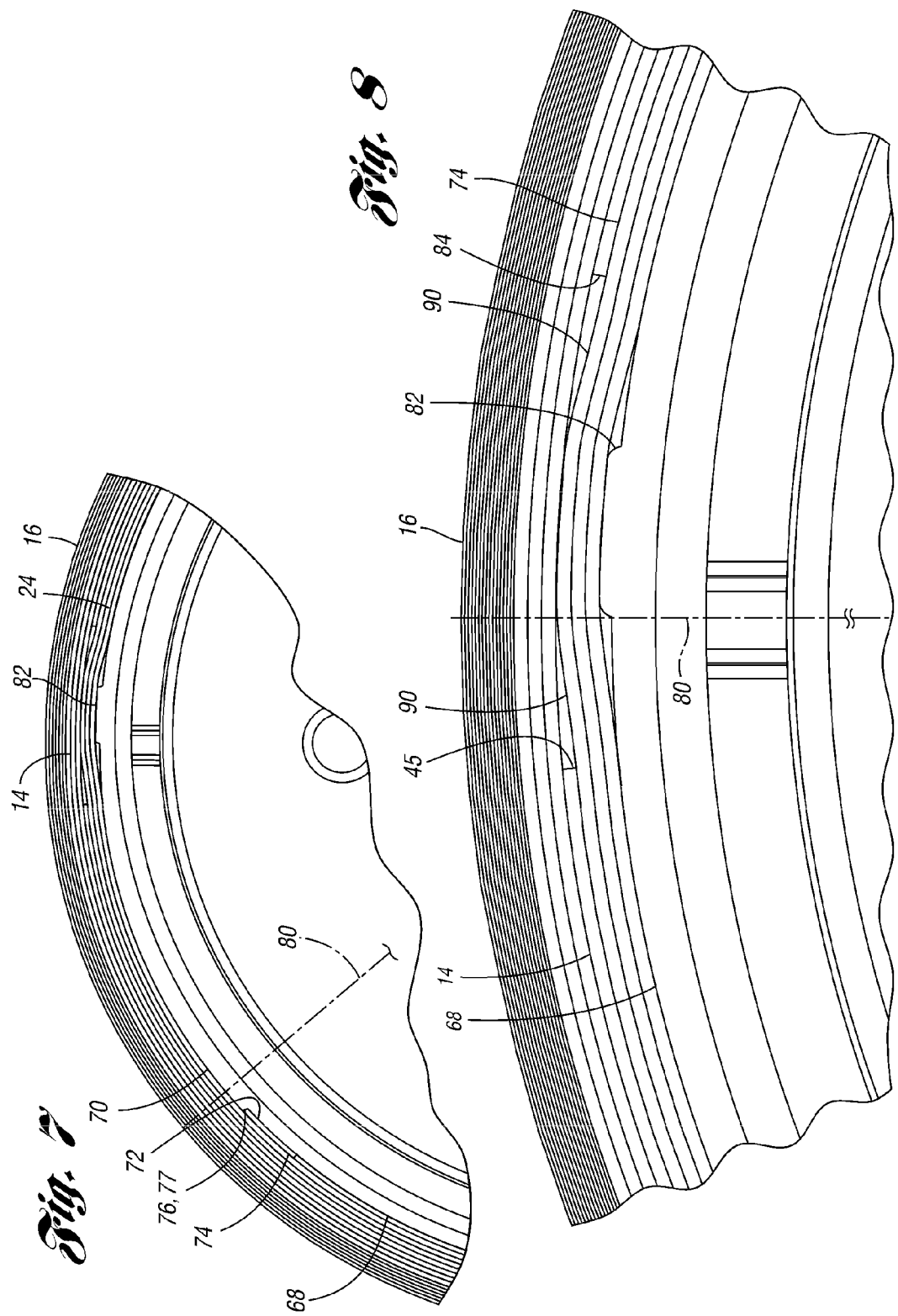

TAPE DRIVE

CROSS-REFERENCE TO RELATED APPLICATIONS

This application is a divisional of U.S. application Ser. No. 11/272,267 filed Nov. 10, 2005, the disclosure of which is incorporated in its entirety by reference herein.

BACKGROUND OF THE INVENTION

1. Field of the Invention

The invention relates to a tape drive for use with a tape cartridge having a cartridge leader attached to magnetic tape.

2. Background Art

Tape drives for use with tape cartridges are known. For example, U.S. Pat. No. 6,565,028 discloses a tape drive that receives a removable tape cartridge.

SUMMARY OF THE INVENTION

According to the present disclosure, a new tape drive is provided for receiving a tape cartridge having a cartridge leader attached to magnetic tape. In one embodiment, the tape drive includes a take-up reel and a drive leader that is attachable to the cartridge leader. The drive leader has an attachment location attached to the take-up reel and a tapered portion proximate the attachment location.

While exemplary embodiments in accordance with the present disclosure are illustrated and disclosed, such disclosure should not be construed to limit the claims. It is anticipated that various modifications and alternative designs may be made without departing from the scope of the claims.

BRIEF DESCRIPTION OF THE DRAWINGS

FIG. 2 is an exploded perspective view of a take-up reel and drive leader of the tape drive;

FIG. 3 is a fragmentary perspective view of a first end of the drive leader;

FIG. 4 is a top fragmentary view of a hub of the take-up reel, and showing the drive leader, cartridge leader and tape wound onto the hub;

FIG. 5 is a top fragmentary view of the hub showing an optional tapered portion of the hub;

FIG. 6 is an exploded perspective view of a take-up reel and drive leader of a second embodiment of a tape drive according to the invention;

FIG. 7 is a fragmentary top view of a hub of the take-up reel of FIG. 6, and showing the drive leader, cartridge leader and tape wound onto the hub;

FIG. 8 is an enlarged fragmentary top view of the hub of FIG. 7; and

FIG. 9 is a fragmentary top view of the drive leader connected to the cartridge leader.

DETAILED DESCRIPTION

Figure 1:
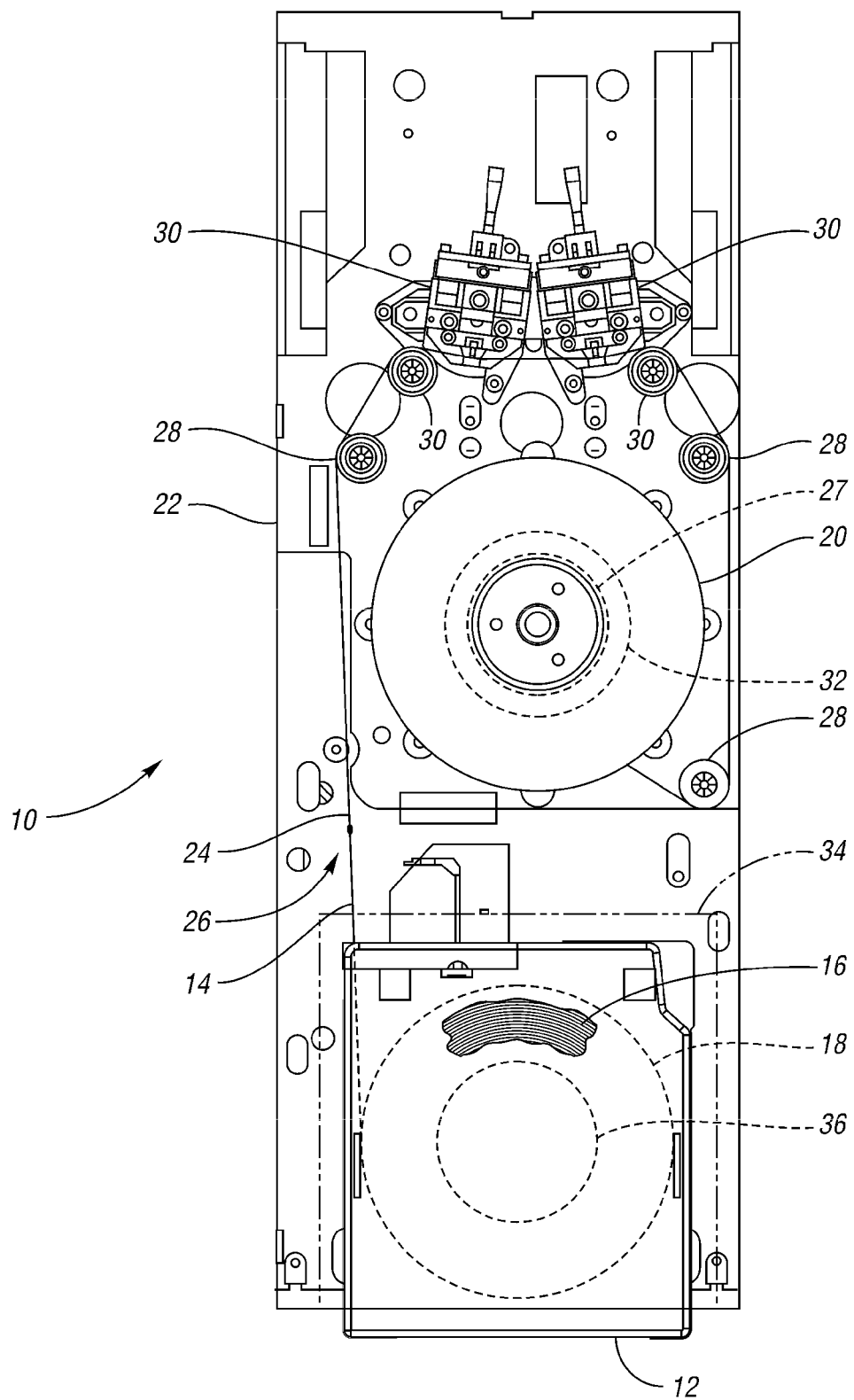
FIG. 1 is a plan view of a tape drive that is configured to receive a tape cartridge having a cartridge leader attached to a length of magnetic tape.

The following description is merely exemplary in nature, and is in no way intended to limit the invention or its application or uses.

FIG. 1 shows a tape drive 10 according to the invention for use with a tape cartridge 12 having a cartridge leader 14 attached to magnetic tape 16, which is wound on a supply reel 18. The tape drive 10 has a take-up reel 20 rotatably supported on a drive body, such as a housing 22, and a drive leader 24 attached to the take-up reel 20. The drive leader 24 is attachable to the cartridge leader 14, and is configured to pull the cartridge leader 14 and tape 16 along a tape path 26 to the take-up reel 20. Moreover, the drive leader 24, cartridge leader 14 and tape 16 are configured to wrap around a hub 27 of the take-up reel 20, such that the tape 16 and leaders 14 and 24 form a tape pack (the portion of the tape pack that is defined by the drive leader 24 may be referred to as a leader pack).

The tape drive 10 further includes one or more guide members, such as rollers 28, for guiding movement of the drive leader 24, cartridge leader 14 and tape 16 along the tape path 26. The tape drive 10 also includes one or more magnetic heads 30 for performing read and/or write operations on the tape 16, a motor 32 for driving the take-up reel 20, and a cartridge receiver 34 for receiving the tape cartridge 12. Furthermore, the cartridge receiver 34 includes a motor 36 that is configured to drive the supply reel 18 of the tape cartridge 12. The components 28, 30, 32, 34 and 36 are mounted in and supported by the housing 22.

Referring to FIG. 2, the drive leader 24 has first and second ends 38 and 40, respectively. The first end 38 has a first attachment location or feature 42 that is attachable to the take-up reel 20 in any suitable manner, and the second end 40 has a second attachment location or feature 44 that is attachable to a first end 45 of the cartridge leader 14 in any suitable manner. For example, the first end 38 may include flange portions 46 that are insertable into slots 48 of the take-up reel 20, and the second end 40 may include a projection, such as a button 50, that is insertable into an aperture 52 of the cartridge leader 14.

Referring to FIGS. 3 and 4, the drive leader 24 also has a tapered portion 54 proximate the first attachment location 42. The tapered portion 54 is configured to provide a generally smooth step as the drive leader 24, cartridge leader 14 and tape 16 wrap around the hub 27 of the take-up reel 20, as shown in FIG. 4. With such a configuration, radial changes in tape pack diameter 56 may be gradual proximate the first end 38 of the drive leader 24. As a result, referring to FIG. 1, velocity and tension variations may be reduced as the tape 16 is pulled from the take-up reel 20 and moved across the heads 30. Consequently, servo track following may be improved compared to prior tape drives.

As shown in FIG. 4, the cartridge leader 14 may also have a tapered portion 58 proximate a second end 60, which is attached to the tape 16. The tapered portion 58 tapers down toward the tape 16, thereby providing a generally smooth step proximate the second end 60 of the cartridge leader 14. As a result, radial changes in tape pack diameter 56 may be further minimized. Moreover, the tapered portions 54 and 58 may be configured to be generally aligned with each other when the cartridge leader 14 and drive leader 24 are wound onto the hub 27. As a result, radial changes in tape pack diameter 56 may be still further minimized.

Moreover, referring to FIG. 5, the hub 27 may be provided with a raised portion 62, such as a tapered portion, that cooperates with the tapered portion 54 of the drive leader 24 to minimize or eliminate radial changes in tape pack diameter proximate the first end 38 of the drive leader 24. In the embodiment shown in FIG. 5, the raised portion 62 tapers in the opposite direction as the tapered portion 54 of the drive leader 24 and is generally aligned with the tapered portion 54, such that the raised portion 62 and tapered portion 54 cooperate to provide a generally smooth surface at the interface between the drive leader 24 and the hub 27.

FIG. 6 shows a take-up reel 64 according to a second embodiment 66 of a tape drive according to the invention. The tape drive 66 is configured to be used with a tape cartridge, such as the tape cartridge 12 described above, and includes similar features as the tape drive 10. Therefore, the following description will focus on features of the tape drive 66 that may be different than the tape drive 10.

Referring to FIGS. 6 and 7, the take-up reel 64 of the tape drive 66 includes a hub 68 having a raised portion 70. The raised portion 70 is configured to be disposed adjacent to a first end 72 of a drive leader 74 of the tape drive 66 when the drive leader 74 is attached to the take-up reel 64. For example, the raised portion 70 may be a tapered portion having a low point 75 and a high point 76, which defines a shoulder 77 disposed proximate a leader attachment location 78, such as a slot, of the take-up reel 64. Furthermore, the raised portion 70 is configured to cooperate with the drive leader 74 to provide a generally smooth step as the drive leader 74, cartridge leader 14 and tape 16 wrap around the hub 68. With such a configuration, radial changes in tape pack diameter 80 may be gradual proximate the first end 72 of the drive leader 74.

Moreover, in the embodiment shown in FIG. 7, the first end 72 is not tapered. In another embodiment, the first end 72 may taper toward the shoulder 77. For example, the shoulder 77 may define a height that is less than the thickness of a main portion of the drive leader 74, and the first end 72 may have a tapered portion that tapers from the thickness of the main portion of the drive leader 24 down to the height of the shoulder 77. Furthermore, the first end 72 may have a taper angle that is generally the same as a taper angle of the raised portion 70, such that the first end 72 cooperates with the raised portion 70 to provide a generally smooth step. Still further, the cartridge leader 14 may be provided with a tapered portion (such as tapered portion 58 described above) that is configured to be generally aligned with the tapered portion of the drive leader 74 and the raised portion 70 of the hub 68 when the drive leader 74 and cartridge leader 14 are wound onto the hub 68. In addition, such a tapered portion of the cartridge leader 14 may define an arcuate length that is generally the same as an arcuate length defined by the tapered portion of the drive leader 74 in combination with the raised portion 70.

Referring to FIGS. 6-8, the hub 68 may also have an additional raised portion 82 that is configured to reduce radial changes in tape pack diameter 80 proximate a second end 84 of the drive leader 74, as explained below in detail. While the additional raised portion 82 may be disposed at any suitable location on the hub 68, in the embodiment shown in FIGS. 6-8, the additional raised portion 82 is disposed on the raised portion 70.

As with the drive leader 24 described above, the second end 84 of the drive leader 74 includes an attachment location or feature that is attachable to an attachment location or feature on the first end 45 of the cartridge leader 14. For example, the second end 84 may include a projection, such as a button 86, that is insertable into aperture 52 of the cartridge leader 14. The drive leader 74 may also include one or more apertures 88 disposed between the ends 72 and 84, and the apertures 88 are configured to be generally aligned with the button 86, or other attachment feature, when the drive leader 74 is wound around the hub 68, as shown in FIG. 9.

As also shown in FIG. 9, the second end 84 of the drive leader 74 and the first end 45 of the cartridge leader 14 may each neck down to a reduced width compared to an adjacent portion of the respective leader 74 or 14. With the above configuration, the resulting tape pack may have one or more void areas 90, due to missing leader portions, proximate the ends 45 and 84 of the leaders 14 and 74. More specifically, the void areas 90 may be defined by and disposed immediately adjacent to the necked-down portions of the ends 45 and 84. As shown in FIG. 8, the additional raised portion 82 is configured to generally compensate for the void areas 90, thereby minimizing or eliminating radial changes in tape pack diameter 80 proximate the ends 45 and 84 of the leaders 14 and 74. Thus, while the additional raised portion 82 may have any suitable size and configuration, in the embodiment shown in FIG. 8, the height of the additional raised portion 82 is generally equal to the thickness of the drive leader 74 and/or cartridge leader 14.

As shown in FIG. 6, the hub 68 may also include a reduced thickness area 92, such as a recess or aperture, that is disposed generally beneath the apertures 88 and the necked-down portions of the ends 45 and 84 of the leaders 14 and 74 when the leaders 14 and 74 are wrapped around the hub 68. Furthermore, the reduced thickness area 92 may extend into the additional raised portion 82, thereby dividing the additional raised portion 82 into two spaced apart sections. With such an configuration, the additional raised portion 82 may function to only support portions of each wrap of drive leader 74 that are disposed beneath the void areas 90.

It is noted that thicknesses of the tape 16 and leaders 14, 24 and 74 are not to scale in the Figures. For example, the leaders 14, 24 and 74 may each be 20 to 30 times thicker than the tape 16. As a more detailed example, the cartridge leader 14 and drive leaders 24 and 74 may each have a thickness of approximately 0.0082 inches, while the tape 16 may have a thickness of approximately 0.000256 inches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the take-up reel 20 of the tape drive 10 may be provided with an additional raised portion, such as described with respect to the tape drive 62.

What is claimed is:

1. A tape drive for receiving a tape cartridge having a cartridge leader attached to magnetic tape, the tape drive comprising:
   a take-up reel; and
   a drive leader that is attachable to the cartridge leader, the drive leader having an attachment location attached to the take-up reel and a tapered portion proximate the attachment location, wherein the tapered portion has a tapered thickness.

2. The tape drive of claim 1 wherein the take-up reel has a hub and the drive leader is configured to wrap around the hub, and wherein the tapered portion is configured to provide a generally smooth step as the drive leader wraps around the hub.

3. The tape drive of claim 1 wherein the take-up reel has a hub and the drive leader is configured to wrap around the hub along with the cartridge leader and tape to form a tape pack, and wherein the tapered portion is configured to reduce radial changes in the tape pack.

4. The tape drive of claim 1 wherein the take-up reel has a hub having a raised portion that is generally aligned with the tapered portion of the drive leader.

5. The tape drive of claim 1 wherein the take-up reel has a hub having a tapered portion that is generally aligned with the tapered portion of the drive leader.

6. The tape drive of claim 5 wherein the tapered portion of the hub tapers in a direction opposite the tapered portion of the drive leader.

7. The tape drive of claim 1 wherein the take-up reel has an outer cylindrical surface about which the drive leader is wrappable, and the attachment location of the drive leader is disposed radially outward of the cylindrical surface.

8. The tape drive of claim 7 wherein the take-up reel has a slot, and the attachment location of the drive leader includes a flange portion that is inserted into the slot.

9. The tape drive of claim 1 wherein the cartridge leader has a tapered portion, and the drive leader is configured to wrap around the take-up reel along with the cartridge leader such that the tapered portion of the drive leader is generally aligned with the tapered portion of the cartridge leader.

10. The tape drive of claim 1 wherein the drive leader has a thickness that is greater than a thickness of the magnetic tape.

11. The tape drive of claim 1 wherein the take-up reel has a hub around which the drive leader is wrappable, the hub having an outer cylindrical surface that extends around a majority of the hub, and a raised portion that extends radially outward of the cylindrical surface, wherein the tapered portion is disposed adjacent the raised portion.

12. A tape drive for receiving a tape cartridge having a cartridge leader attached to magnetic tape, the tape drive comprising:

a take-up reel; and a drive leader that is releasably attachable to the cartridge leader, the drive leader having a thickness that is greater than a thickness of the tape, an attachment location attached to the take-up reel and a tapered portion proximate the attachment location, wherein the tapered portion has a tapered thickness.

13. The tape drive of claim 12 wherein the take-up reel has a hub having a tapered portion that is generally aligned with the tapered portion of the drive leader.

14. The tape drive of claim 13 wherein the tapered portion of the hub has a tapered thickness.

15. The tape drive of claim 12 wherein the cartridge leader has a tapered portion having a tapered thickness, and the drive leader is configured to wrap around the take-up reel along with the cartridge leader when the drive leader is attached to the cartridge leader such that the tapered portion of the drive leader is generally aligned with the tapered portion of the cartridge leader.

16. The tape drive of claim 12 wherein, when the drive leader is attached to the cartridge leader, the drive leader is configured to wrap around the take-up reel along with the cartridge leader and the tape to form a tape pack, and wherein the tapered portion is configured to reduce radial changes in the tape pack.

* * * * *